Patented Sept. 15, 1942

2,295,867

UNITED STATES PATENT OFFICE 2,295,867

5 - (SULPHANILAMIDO) -2-SUBSTITUTED PYRIDINES AND RELATED COMPOUNDS

Richard O. Roblin, Jr., and Philip Stanley Winnek, Stamford, Conn., assignors to American Cyanamid Company, New York, N. Y., a corporation of Maine No Drawing. Application February 28, 1940, Serial No. 321,282

10 Claims. (Cl. 260—295)

This invention relates to 5-(sulphanilamido)-2-substituted pyridines and related compounds.

The present invention is directed to a new class of chemical compounds some of which are useful in the treatment of infectious diseases, and particularly of streptococcus and pneumococcus infections, while being at the same time relatively non-toxic. Many of the new compounds are also useful as intermediates for preparing other substances such as azo dyes.

We have found that many of the new compounds of the present invention show increased therapeutic activity, lower toxicity and longer maintenance of effective blood level as compared to sulphanilamide and sulphapyridine.

The compounds of the present invention have the following general formula:

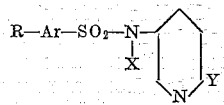

in which R is an amino, nitro, acylamino, monoaldose amino or sodium formaldehyde sulphoxylate group, Ar represents p-arylene or p-arylenesulphonamido p-arylene group, X is hydrogen or a metal, and Y is a halogen substituent. When R is an amino radical the invention also includes the mono-aldose derivatives thereof, particularly the aldohexose derivatives.

While the present invention is not limited to any particular process of producing the new compounds, we have found that good yields of the compounds in which R is a nitro radical are obtained by reacting the appropriate 2-halogen-substituted-5-amino pyridine with p-nitrobenzene sulphonyl chloride in the presence of pyridine. This reaction mixture is then neutralized with a suitable alkali such as sodium hydroxide to give a precipitate of the 5-(p-nitrobenzene sulphonamido)-2-substituted pyridine. When the amino compound is desired it can easily by prepared by reducing the corresponding nitro compound as obtained above.

The (p-acylaminobenzene sulphonamido)-2-halogen substituted pyridines can be prepared by reacting a p-acylaminobenzene sulphonyl chloride with 2-substituted, 5-amino-pyridine in the presence of pyridine and neutralizing with sodium hydroxide or suitable alkali, as pointed out above in the process of preparing the nitro compound.

In carrying out the invention any halogen substituent that will normally go in the 2 position on the pyridine ring, designated as Y in the general formula given above can be used. Salts are also included in this invention, and as pointed out in connection with the general formula, the aldo-hexose derivatives can be prepared when R is an amino radical. Among the salts and derivatives that can be produced are the salts of various acids, metallic salts such as those of the alkali metal or heavy metals, the sodium formaldehyde sulphoxylate derivatives and aldose derivatives such as those of the aldohexoses,—glucose, galactose, etc. Many of the above salts and derivatives are soluble in water which is an advantage in some cases.

Among the compounds that can be prepared according to the process of the present invention are the compounds such as the 5-(p-nitrobenzene sulphonamido)-2-halogen pyridines such as 5-(p-nitrobenzene sulphonamido)-2-chloro pyridine and 5-(p-nitrobenzene sulphonamido)-2-bromo pyridine, and various salts of such compounds.

The 5-(p-aminobenzene sulphonamido)-2-halogen substituted pyridines corresponding to the above nitro compounds can also be prepared according to the present invention. In the case of these amino compounds the aldose derivatives, such as the aldo monosaccharides, and particularly the aldohexoses can be prepared and in many cases are thus made available in a water soluble form.

The 5-(p-acylaminobenzene sulfoamido)-2-substituted pyridines corresponding to the nitro compounds above are also included in the present invention. The acyl radical can be either aliphatic, aromatic, or heterocyclic such as for example, butyryl, acetyl, benzoyl, nicotinyl, etc.

The present invention is primarily concerned with compounds as pointed out, when the substituent halogen group is in the 2 position on the pyridine ring. The same process, however, can be used to prepare compounds in which the substituent group is not in the 2 position as well as those compounds in which there may be more than one substituent group on the pyridine ring.

The invention will be described in greater detail in conjunction with the following specific examples which are merely illustrative of the preferred methods of preparing certain typical compounds and not intended to limit the scope of the invention. The parts in the following examples are by weight except in the case of liquids which are corresponding parts by volume.

EXAMPLE 1

5-(P-Nitrobenzene Sulphonamido)-2-Chlorpyridine

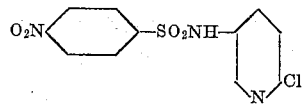

25.5 parts (0.2 mol) of 2-chloro-5-aminopyridine was reacted with 50 parts (0.225 mol) of p-nitrobenzene sulphonyl chloride in the presence of 50 parts of dry pyridine. After heating the reaction mixture for one hour on the steam bath, 11 parts of sodium hydroxide dissolved in 150 parts of water was added slowly. The mixture was then diluted with 10 volumes of water. A dark red oil separated which on chilling in an ice bath turned to a yellow brown solid. The crude 5-(p-nitrobenzenesulphonamido)-2-chlorpyridine obtained in this manner was crystallized from an alcohol-water mixture.

EXAMPLE 2

5-(Sulphanilamido)-2-Chlorpyridine

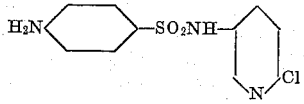

The 5-(p-nitrobenzenesulphonamido)-2-chlorpyridine obtained in the preceding example, 42 parts (0.13 mol), was gradually added to a hot suspension of 130 parts of iron dust in 420 parts of 95% ethanol containing 3 parts of hydrochloric acid (1:1). The reaction mixture was heated on a steam bath under reflux and with stirring for about 7 hours. It was then neutralized with dilute sodium hydroxide solution, filtered hot and the filtrate after cooling was diluted with 1200 parts of water. The crude 5-(sulphanilamido)-2-chlorpyridine separated as a yellow crystalline material. The crude product was crystallized three times from an alcohol-water mixture using zinc dust and charcoal to remove color. The purified material was a pure white crystalline product. M. P. 186°–187° C. (corr.). Analysis gave, within experimental limits, theoretical values for carbon and hydrogen.

EXAMPLE 3

5-(P-Nitrobenzene Sulphonamido)-2-Brompyridine

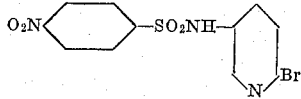

23 parts (0.135 mol) of 2-brom-5-aminopyridine was dissolved in 35 parts of dry pyridine and 31 parts (0.14 mol) of p-nitrobenzene sulphonyl chloride was added gradually with stirring and with the temperature maintained at 50° C.±5° C. The reaction mixture was then heated on a steam bath for one hour with stirring. 6 parts of sodium hydroxide dissolved in 200 parts of hot water was added and stirring and heating were continued for one hour. A brownish-red oil separated which on cooling in an ice bath changed to a yellow solid. This crude 5-(p-nitrobenzene sulphonamido)-2-brompyridine was crystallized from an alcohol-water mixture.

EXAMPLE 4

5-(Sulphanilamido)-2-Brompyridine

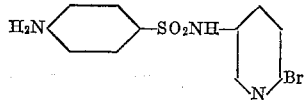

32 parts (0.089 mol) of recrystallized 5-(p-nitrobenzene sulphonamido) - 2 - brompyridine from preceding example was added to a hot suspension of 100 parts of iron dust in 250 parts of 95% ethanol containing 3 parts of concentrated hydrochloric acid. Stirring and heating under reflux on a steam bath were continued 18 hours. The reaction mixture was then made slightly alkaline with sodium hydroxide solution and filtered hot. The cooled, alcoholic filtrate was diluted with a large volume of water and the 5-(sulphanilamido)-2-brompyridine separated as a white crystalline material. It was purified by crystalling twice from an alcohol-water mixture, M. P. 196°–197° C. (corr.). Analysis gave, within experimental limits, theoretical values for carbon, hydrogen and nitrogen.

EXAMPLE 5

Preparation of Sodium Formaldehyde Sulphoxylate Derivatives

The sodium formaldehyde sulphoxylate derivatives of the amino compounds included in the preceding examples may be prepared by reacting the appropriate amino derivative with a slight excess of sodium formaldehyde sulphoxylate in glacial acetic acid and precipitating the product with dry ether.

EXAMPLE 6

Preparation of Metallic Salts

The alkali metal salts of the compounds may be prepared by reacting the appropriate compound with an alkaline hydroxide, and throwing out the alkali salt by adding excess solid alkaline hydroxide to the solution. The alkali metal salts may be recrystallized from aqueous alcohol.

Salts of the heavier metals, as for example the copper, gold, lead and iron salts and the like, may be formed by reacting the alkali metal salts preferably in water solution with a suitable soluble salt of the metal desired, whereupon the desired product is obtained usually as a precipitate.

EXAMPLE 7

Sugar Derivatives

The sugar derivatives of the compounds may be prepared in most cases by refluxing an alcoholic suspension of the appropriate sugar, such as glucose, galactose, sucrose, etc., with the compound. After a varying length of time of heating the reaction mixture becomes a homogeneous solution and on cooling the sugar derivative crystallizes. They have the decided advantage of high solubility in water.

Many of the compounds of the present invention have been found to have enhanced therapeutic effects as compared to sulphapyridine.

The data in the following tables illustrate the improved therapeutic value of two of the preferred compounds of the invention when compared to sulphapyridine.

Mice were given per os 10 mg. doses of sulphapyridine, 5(sulphanilamido)-2-chloropyridine, and 5(sulphanilamido)-2-bromopyridine and tests on the blood (Marshall method) were made at intervals to determine the blood level of the respective compounds. The following data represents the average results of several tests.

Table I

| Blood level: | Hours | | | | | | | |
|---|---|---|---|---|---|---|---|---|
| | 1 | 2 | 4 | 8 | 12 | 24 | 32 | 48 |
| Sulphapyridine | 14.3 | 10 | 7.7 | — | + | 0 | 0 | 0 |
| 5(sulphanilamido)-2-bromopyridine | 3.5 | 4 | 2.5 | 2.5 | — | 1.3 | | |
| 5(sulphanilamido)-2-chloropyridine | 7 | 7.8 | 8 | 6 | — | 4 | 2.5 | 1.8 |

+ Trace.
— No determination.

The above data shows that while sulphapyridine resulted in a high blood level in a short time, the 5(sulphanilamido)-2-bromopyridine and 5(sulphanilamido)-2-chloropyridine reached an effective blood level in an equally short time and were maintained at an effective level long after the sulphapyridine had disappeared.

Table II shows the results of tests in which mice were inocculated with beta-hemolytic streptococci and divided into four groups, one of which was given sulphapyridine, one 5(sulphanilamido)-2-chloropyridine, another 5(sulphanilamido)-2-bromopyridine and the fourth served as controls.

All the controls died, and the following data represents the percent survival of the other groups.

Table II

| | Average percent survival |
|---|---|
| Sulphapyridine | 40 |
| 5(sulphanilamido)-2-chloropyridine | 62 |
| 5(sulphanilamido)-2-bromopyridine | 90 |

The above data shows that the 5(sulphanilamido)-2-chloropyridine was 22% more effective than sulphapyridine and that 5(sulphanilamido)2-bromopyridine was 50% more effective than sulphapyridine.

It is apparent from the data in the above tables that these typical compounds of the present invention are more active therapeutically than sulphapyridine against streptococcal infections and that an effective blood level is maintained for a longer period of time. It is therefore an advantage of the present invention that compounds are provided which may be administered in smaller doses than sulphapyridine while at the same time obtaining equivalent therapeutic effect and a lessening of toxic effects, which is one of the disadvantages of sulphapyridine therapy.

We claim:
1. Compounds of the formula:

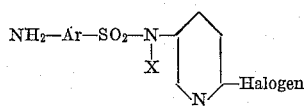

in which Ar represents a member of the group consisting of p-arylene and p-arylenesulphonamido p-arylene radicals and X represents a member of the group consisting of hydrogen and metals.

2. Compounds of the formula:

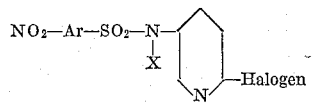

in which Ar represents a member of the group consisting of p-phenylene and p-arylenesulphonamido p-phenylene radicals, and X represents a member of the group consisting of hydrogen and metals.

3. Compounds of the following formula:

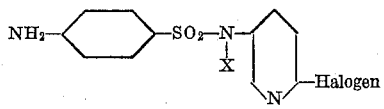

in which X represents a member of the group consisting of alkali metals and hydrogen.

4. Compounds of the following formula:

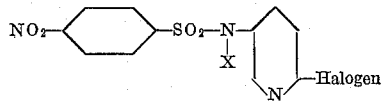

in which X represents a member of the group consisting of alkali metals and hydrogen.

5. Compounds of the formula:

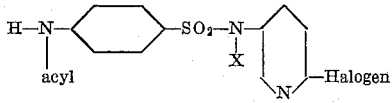

in which X represents a member of the group consisting of alkali metals and hydrogen.

6. Compounds of the formula:

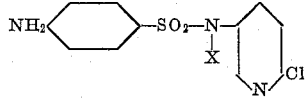

in which X represents a member of the group consisting of alkali metals and hydrogen.

7. Compounds of the formula:

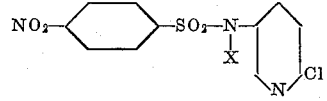

in which X represents a member of the group consisting of alkali metals and hydrogen.

8. Compounds of the formula:

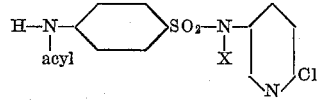

in which X represents a member of the group consisting of alkali metals and hydrogen.

9. The process of preparing 5-(acylaminobenzene sulphonamido)-2-halogen-substituted pyridines which comprises reacting a 2-halogen-substituted 5-amino-pyridine with p-acylaminobenzene sulphonyl chloride in an organic solvent and then neutralizing with an alkali metal hydroxide and separating the 5-(p-acylaminobenzene sulphonamido)-2-substituted pyridine.

10. Compounds of the formula:

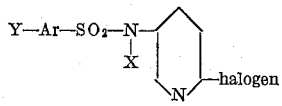

wherein Y is a member of the group consisting of

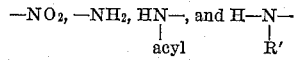

wherein R' is a sodium formaldehyde sulphoxylate radical, Ar represents a member of the group consisting of p-phenylene and p-phenylene-sulphonamido-p-phenylene radicals, and X represents a member of the group consisting of hydrogen and metals.

RICHARD O. ROBLIN, Jr.
PHILIP STANLEY WINNEK.

CERTIFICATE OF CORRECTION.

Patent No. 2,295,867.

September 15, 1942.

RICHARD O. ROBLIN, JR., ET AL.

It is hereby certified that error appears in the printed specification of the above numbered patent requiring correction as follows: Page 1, first column, line 42, before "substituted" insert --halogen--; and second column, lines 40 and 41, for "substituent halogen" read --halogen substituent--; page 2, first column, line 63, for "35 parts" read --33 parts--; and second column, line 21, for "crystalling" read --crystallizing--; page 3, first column, line 63, both occurrences, and line 64, claim 1, line 74, claim 2, for "arylene" read --phenylene--; and second column, line 57, claim 9, before "substituted" insert --halogen--; and that the said Letters Patent should be read with this correction therein that the same may conform to the record of the case in the Patent Office.

Signed and sealed this 12th day of January, A. D. 1943.

Henry Van Arsdale, (Seal)  Acting Commissioner of Patents.